United States Patent
Oh et al.

(10) Patent No.: US 11,549,697 B2
(45) Date of Patent: Jan. 10, 2023

(54) AIR CLEANER INCLUDING THERMOELECTRIC MODULE

(71) Applicant: LG ELECTRONICS INC., Seoul (KR)

(72) Inventors: Minkyu Oh, Seoul (KR); Yanghwan No, Seoul (KR); Seungmin Yoo, Seoul (KR); Hyunshin Kee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 405 days.

(21) Appl. No.: 16/678,396

(22) Filed: Nov. 8, 2019

(65) Prior Publication Data

US 2020/0166226 A1 May 28, 2020

(30) Foreign Application Priority Data

Nov. 27, 2018 (KR) .......................... 10-2018-0147994

(51) Int. Cl.
*F24F 5/00* (2006.01)
*G01K 7/02* (2021.01)
*F24F 1/0071* (2019.01)

(52) U.S. Cl.
CPC .............. *F24F 5/0042* (2013.01); *G01K 7/02* (2013.01); *F24F 1/0071* (2019.02)

(58) Field of Classification Search
CPC .. F24F 5/0042; F24F 8/10; F24F 13/20; F24F 1/0071; F24F 3/16; G01K 7/02; B01D 2279/50
See application file for complete search history.

(56) References Cited

U.S. PATENT DOCUMENTS

| 5,255,520 A | * | 10/1993 | O'Geary | ................. F25B 21/02 62/3.2 |
| 2004/0118093 A1 | * | 6/2004 | Chang | ................ B01D 46/0006 55/482 |
| 2005/0081556 A1 | * | 4/2005 | Kim | ......................... F24F 3/16 62/411 |

FOREIGN PATENT DOCUMENTS

| CN | 1584428 A | 2/2005 |
| CN | 106369712 A | 2/2017 |
| CN | 108626933 A | 10/2018 |
| CN | 109312942 A | 2/2019 |
| CN | 110381713 A | 10/2019 |
| EP | 1995527 A1 | 11/2008 |
| JP | 2002369834 A | 12/2002 |
| JP | 5127347 B2 | 11/2012 |
| JP | 2017178087 A | 10/2017 |
| KR | 10-2014-0014306 A | 2/2004 |
| KR | 101003617 B1 * | 4/2010 |
| KR | 101003617 B1 * | 12/2010 |
| KR | 101653344 B1 | 9/2016 |
| KR | 1020170124210 A | 11/2017 |
| KR | 20180036109 A * | 4/2018 |
| KR | 1020180036109 A | 4/2018 |

* cited by examiner

*Primary Examiner* — Frantz F Jules
*Assistant Examiner* — Martha Tadesse
(74) *Attorney, Agent, or Firm* — Dentons US LLP

(57) ABSTRACT

An air cleaner including a thermoelectric module includes a blowing fan, a filter, and a thermoelectric module, so it is possible to generate cold air or hot air and perform air purification.

19 Claims, 13 Drawing Sheets

AIR CLEANER INCLUDING THERMOELECTRIC MODULE

CROSS-REFERENCE TO RELATED APPLICATIONS

This application claims priority under 35 U.S.C. 119 and 35 U.S.C. 365 to Korean Patent Application No. 10-2018-0147994 filed on Nov. 27, 2018 in Korea, the entire contents of which is hereby incorporated by reference in its entirety.

FIELD OF THE DISCLOSURE

The present disclosure related to an air cleaner including a thermoelectric module.

BACKGROUND

Recently, an environmental contamination problem such as particulate matter has had a large influence on life. When particulate matter is intense outside, it is difficult to ventilate the interior, and even if the interior is ventilated, the external particulate matter enters the inside and threatens the health of people. Accordingly, products such as air cleaners have been continuously developed.

In general, air cleaners that are on the market have relatively large capacity and are configured to be placed in a room or a dining room and purify the air in the entire rooms. However, even though an air cleaner is operated, there are some places that the air cleaner does not reach, such as a room that is slightly isolated or a small dining room in an interior. Accordingly, there is a burden in that an installation of a separate air cleaner in such an isolated room or a small dining room is required.

Meanwhile, when a person sits on a chair and studies at a desk, the height of respiratory organ of the person is about 1 m or more from the floor. Accordingly, when an air cleaner is placed and operated on the floor, the air purification may be weak at the height corresponding to the person's respiratory organ.

SUMMARY

In order to solve the problems described above, one aspect of the present disclosure is to provide an air cleaner including a thermoelectric module, the air cleaner being able to make a user feel comfortable by supplying conditioned air.

Another aspect is to provide an air cleaner including a thermoelectric module, the air cleaner being able to configure a compact cold air (or hot air) generator by generating cold air (hot air) using a thermoelectric module.

Another aspect is to provide an air cleaner including a thermoelectric module, the air cleaner being able to generate both of the airflow passing through the thermoelectric module and the airflow flowing into a blowing portion, using one blowing fan.

Another aspect is to provide an air cleaner including a thermoelectric module, the air cleaner being able to be detachably coupled to a furniture such as a desk.

Another aspect is to provide an air cleaner including a thermoelectric module in which a supply channel and a heat dissipation channel can be easily formed by having a blowing fan and a heat dissipation fan.

An air cleaner according to an embodiment of the present disclosure includes a blowing fan, a filter, and a thermoelectric module, so it is possible to generate cold air or hot air and perform air purification.

The air cleaner includes a blower housing that accommodates the blowing fan, and a blowing suction port for introducing external air is formed through a side of the blower housing.

Air suctioned through the blowing suction port and air that has passed through the thermoelectric module are mixed, and the mixed air is discharged through a discharge portion of the air cleaner.

The thermoelectric module further includes a module body having first and second suction cover through which air is suctioned.

An air channel is formed in the module body and a module insulator disposed to divide the air channel is further included.

The thermoelectric module is disposed under the blower housing, and a module coupling portion to which the thermoelectric module is coupled is formed on a bottom surface of the blower housing.

The blowing suction port is formed at both sides of the module coupling portion.

The filter is disposed at a lower portion in the blower housing and covers the blowing intake port and an upper portion of the module coupling portion.

The air cleaner further includes a channel guide disposed in the blower housing to surround the blowing fan.

The channel guide includes: a first curved portion extending to be curved at a first side of an outer circumferential surface of the blowing fan; and a second curved portion extending to be curved at a second side of the outer circumferential surface of the blowing fan.

The discharge portion may protrude outside the blower housing.

The discharge portion includes discharge vanes configured to be able to open and close.

An air cleaner according to another aspect includes a discharge portion that is disposed on a surface of furniture, and the discharge portion may form the same plane as the surface of the furniture.

According to the air cleaners described above, a user may feel comfortable by supplying conditioned air in order to solve the problems described above.

Further, it is possible to generate cold air or hot air using a thermoelectric module, and thus it is possible to provide an air conditioner that is compact and generates less noise.

Further, since it is possible to generate both of the airflow passing through the thermoelectric module and the airflow flowing into a blowing portion using one blowing fan, the operation performance of the air cleaner can be improved.

Further, the air cleaner can be attached/detached to/from furniture such as a desk, and convenience in use can be increased.

Further, a blowing fan and a heat dissipation fan are separately provided, so a supply channel and a heat dissipation channel can be easily formed, and reliability of the product can be improved.

DETAILED DESCRIPTION

Figure 1:
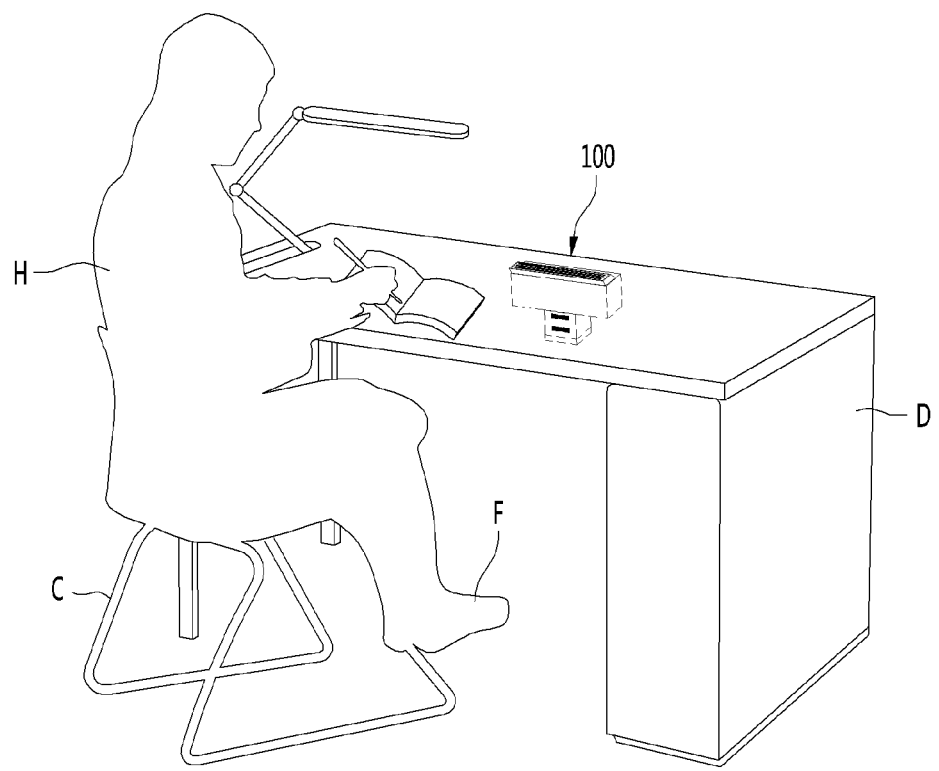
FIG. 1 is a view showing a user using an air cleaner according to an embodiment of the present disclosure.

Hereinafter, embodiments of the present disclosure are described in detail with reference to exemplary drawings. It should be noted that when components are given reference numerals in the drawings, the same or similar components may be given the same reference numerals even if they are shown in different drawings. Further, in the following description of embodiments of the present disclosure, when detailed description of well-known configurations or functions is determined as obscuring the understanding of the embodiments of the present disclosure, they may be omitted or not described in detail.

Further, terms 'first', 'second', 'A', 'B', '(a)', and '(b)' may be used in the following description of the components of embodiments of the present disclosure. The terms are provided only for discriminating components from other components and, the essence, sequence, or order of the components are not limited by the terms. When a component is described as being "connected", "combined", or "coupled" with another component, it should be understood that the component may be connected or coupled to another component directly or with another component interposing therebetween.

Figure 2:
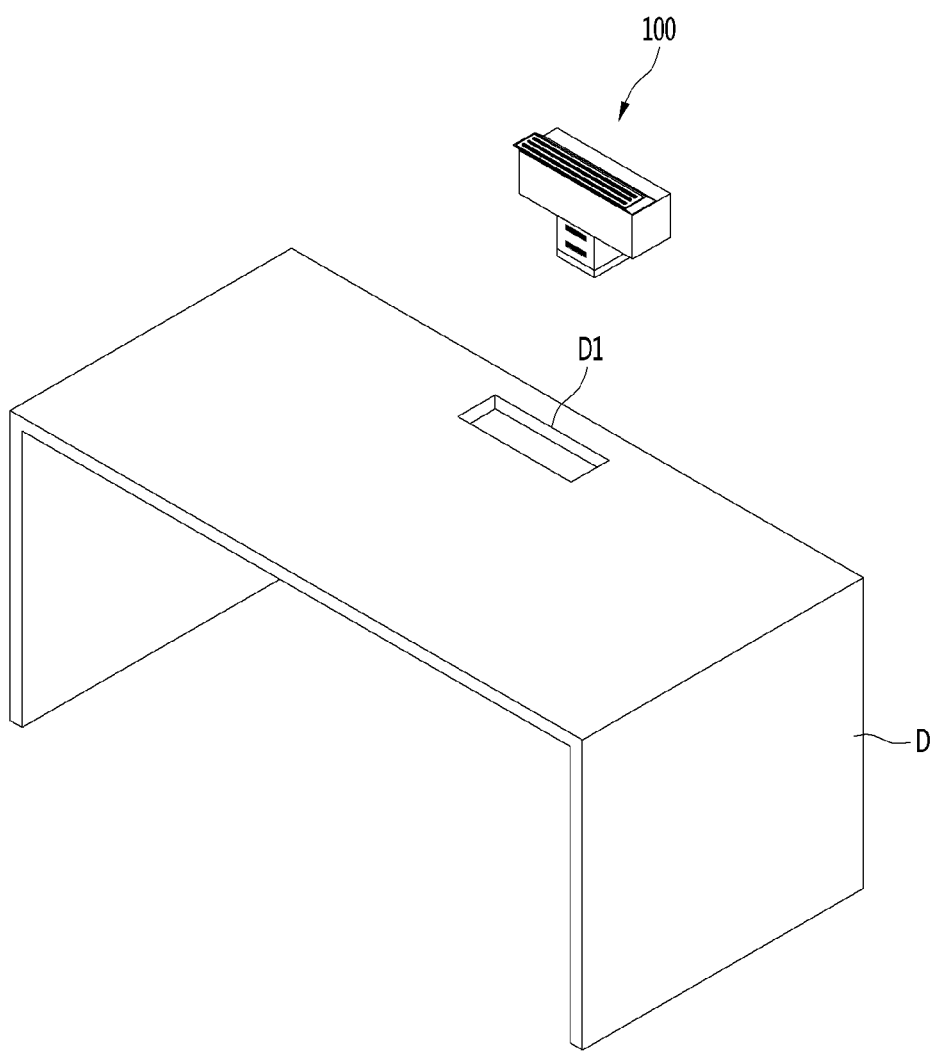
FIG. 2 is an exploded perspective view showing a state in which the air cleaner according to an embodiment of the present disclosure may be installed on a desk.

FIG. 1 is a view showing a user using an air cleaner according to an embodiment of the present disclosure and FIG. 2 is an exploded perspective view showing a state in which the air cleaner according to an embodiment of the present disclosure may be installed on a desk.

Referring to FIG. 1, a user H may use an air cleaner 100 according to an embodiment of the present disclosure when sitting on a chair C and studying at a desk D.

In detail, the air cleaner 100 may be disposed on the top surface of the desk D. A discharge portion 400 (see FIG. 3) may be disposed at the upper portion of the air cleaner 100 and may be positioned at a height substantially same or similar to the top surface of the desk D. Air discharged from the discharge portion 400 may be discharged towards the upper body of the user from the top surface of the desk D.

The air cleaner 100 may be supplied with power through an electrical wire (not shown) connected to a power supply. The air cleaner 100 is not limited thereto and may be supplied with power from a battery disposed therein.

The air cleaner 100 may be provided to be attachable/detachable to/from the furniture such as the desk D. For example, a coupling portion D1 may be formed at the desk D and the air cleaner 100 may be inserted in the coupling portion D1, whereby the air cleaner 100 may be supported by the desk D.

The air cleaner 100 may be used as a separate stand-alone air cleaner product without being supported by any objects. In this case, a user may easily move and operate the air cleaner 100 having a relatively small size at a desired place.

Figure 3:
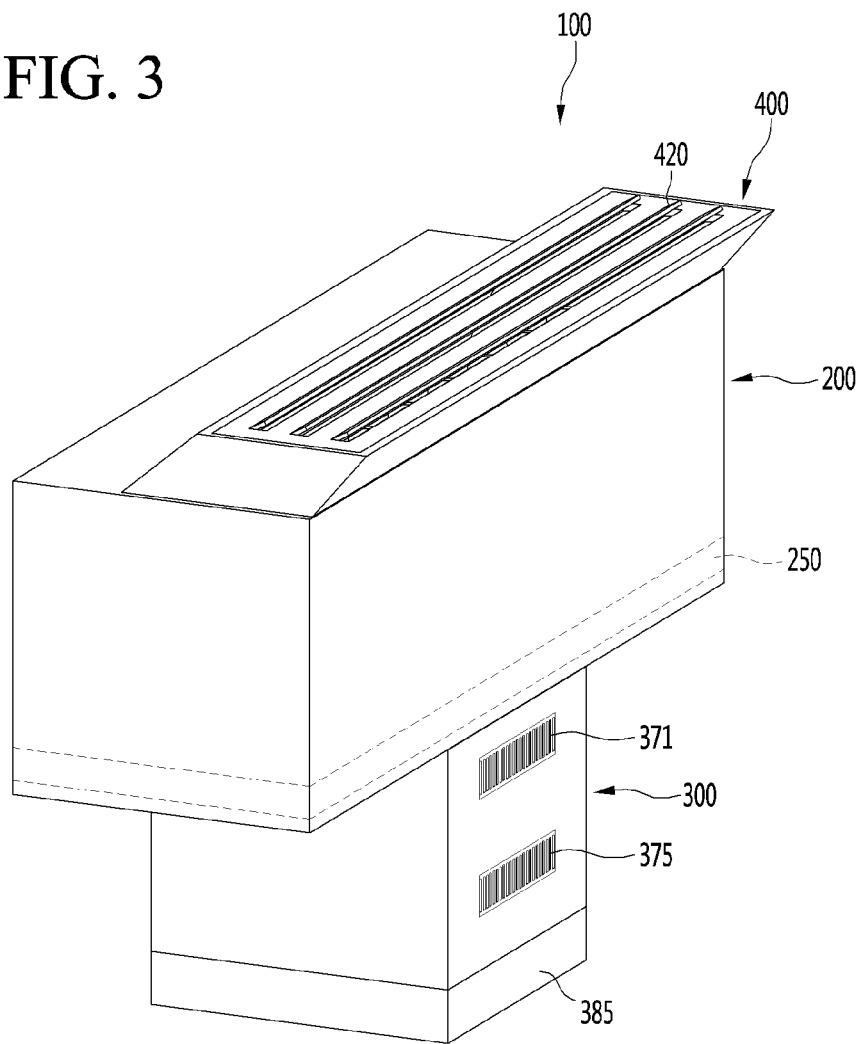
FIG. 3 is a perspective view of the air cleaner according to an embodiment of the present disclosure.
Figure 4:
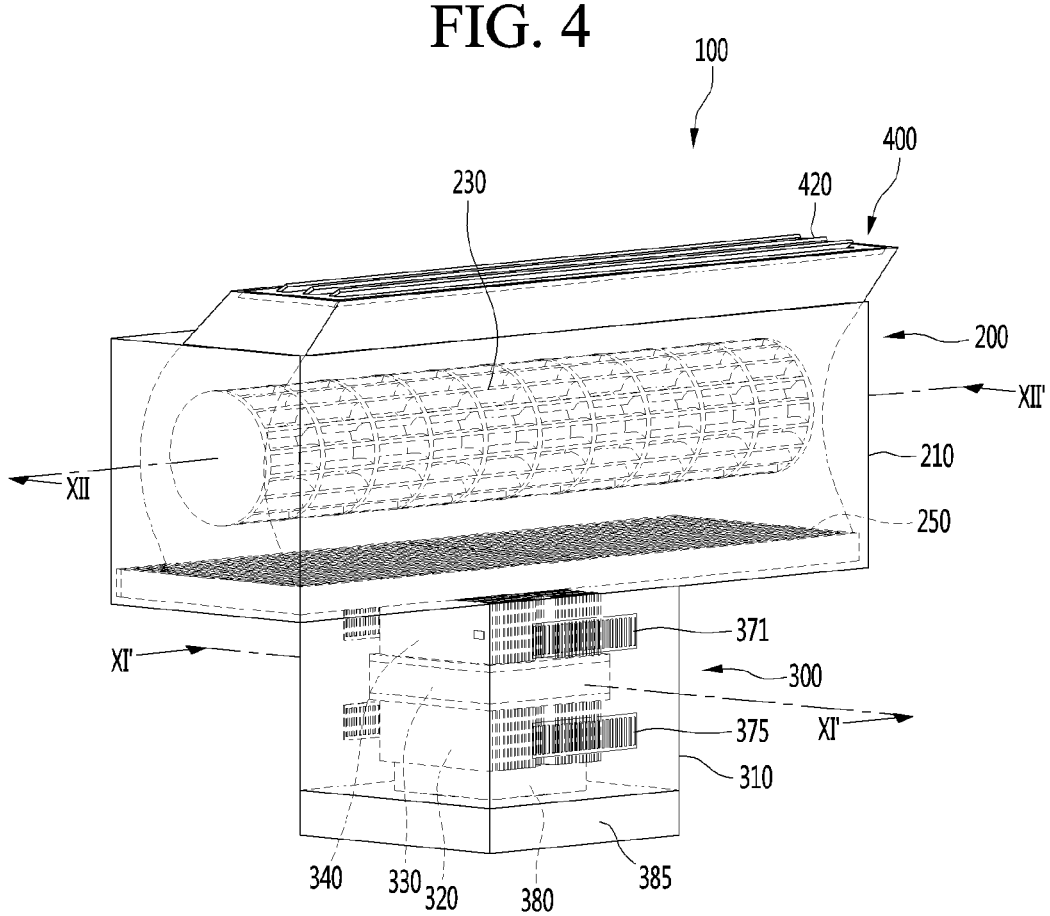
FIG. 4 is a transparent view showing an interior of the air cleaner according to an embodiment of the present disclosure.
Figure 5:
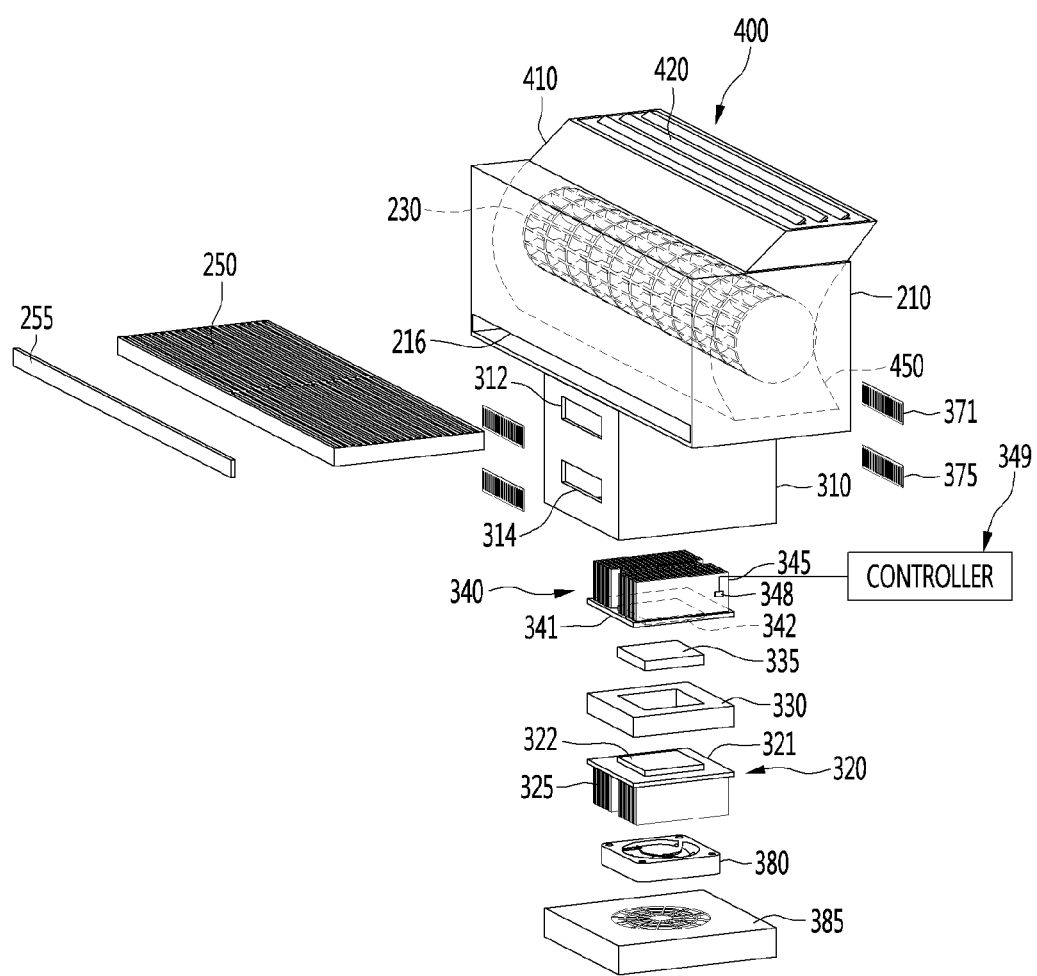
FIG. 5 is an exploded perspective view of the air cleaner according to an embodiment of the present disclosure.
Figure 6:
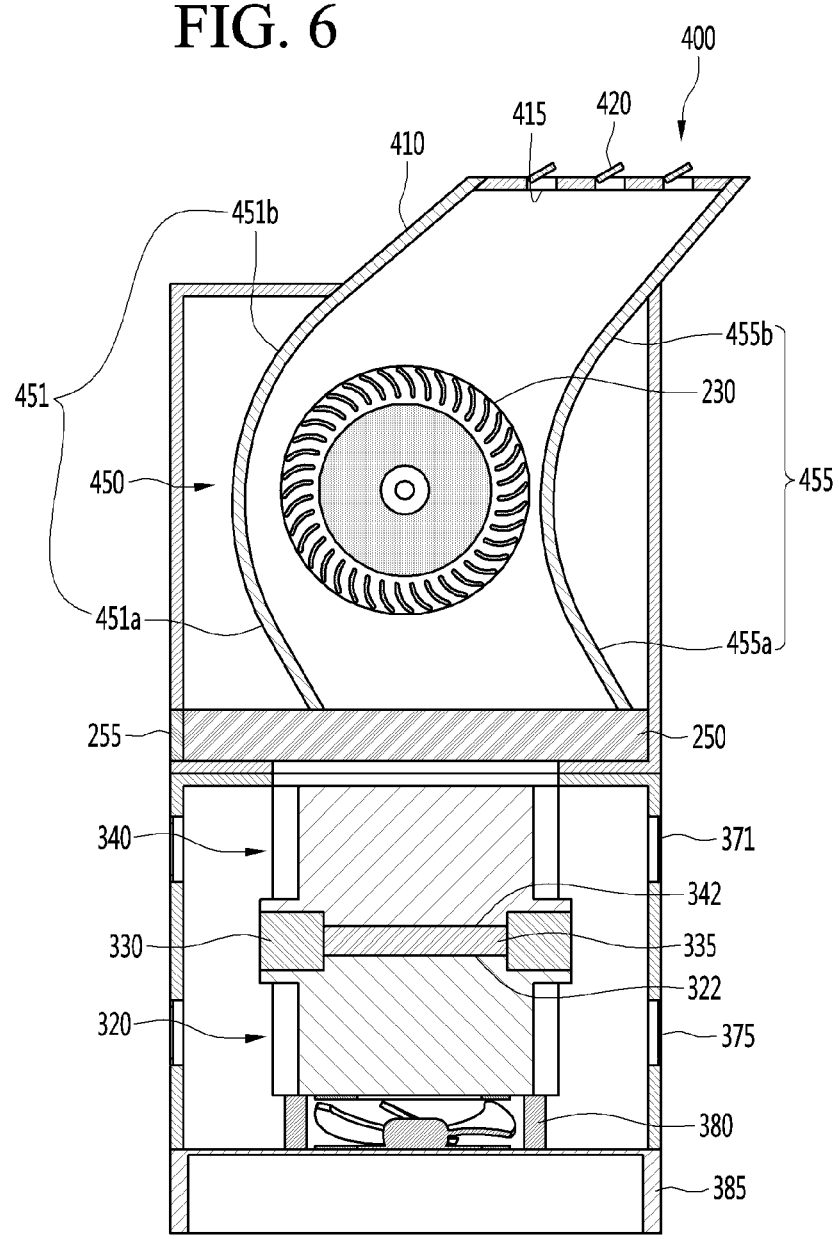
FIG. 6 is a cross-sectional view taken along line XI-XI' of FIG. 4.
Figure 7:
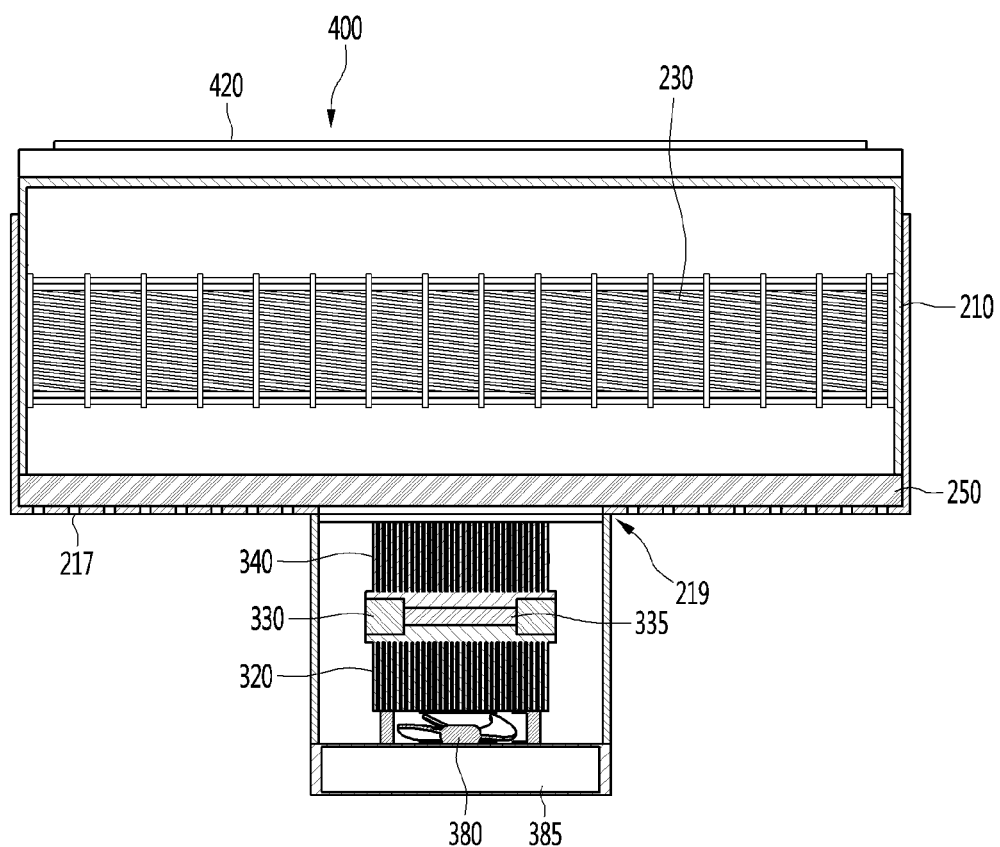
FIG. 7 is a cross-sectional view taken along line XII-XII' of FIG. 4.

FIG. 3 is a perspective view of the air cleaner according to an embodiment of the present disclosure, FIG. 4 is a transparent view showing an interior of the air cleaner according to an embodiment of the present disclosure, FIG. 5 is an exploded perspective view of the air cleaner according to an embodiment of the present disclosure, FIG. 6 is a cross-sectional view taken along line XI-XI' of FIG. 4, and FIG. 7 is a cross-sectional view taken along line XII-XII' of FIG. 4.

Referring to FIGS. 3 to 7, the air cleaner 100 according to an embodiment of the present disclosure may include a blowing portion 200 that generates airflow, a thermoelectric module 300 that is disposed on a first side of the blowing portion 200, and a discharge portion 400 that is disposed on a second side of the blowing portion 200 and discharges air that has passed through the blowing portion 200.

For example, the thermoelectric module 300 may be disposed under the blowing portion 200 and the discharge portion 400 may be disposed over the blowing portion 200.

In detail, the blowing portion 200 may include a blowing portion housing 210 having a substantially hexahedral shape and a blowing fan 230 installed in the blower housing 210. Further, a filter 250 for purifying air may be disposed at an inlet of the blowing fan 230. For example, the filter 250 may be disposed under the blowing fan 230.

The blowing fan 230 may be a centrifugal fan including a cross-flow fan and the like. When the blowing fan 230 is driven, air may be suctioned in the circumferential direction of the blowing fan 230 and may be discharged in the circumferential direction. For example, air may be suctioned from under the blowing fan 230 and discharged upward towards the discharge portion 400.

The filter 250 may be provided in a size corresponding to the bottom surface of the blower housing 210. For example, the filter 250 may have a hexahedral shape having a small height.

The filter 250 may close the space under the blowing fan 230, so air suctioned through the bottom surface of the blower housing 210 may be suctioned to the blowing fan 230 through the filter 250. The air passing through the blowing portion 200 may be purified by the filter 250.

The filter 250 may be detachably mounted in the blower housing 210. A filter opening 216 is formed at the lower portion of the blower housing 210. The filter member 250 may be put into or taken out of the blower housing 210 through the filter opening 216.

The blowing portion 200 may further include a filter cover 255 detachably coupled to the blower housing 210. The filter cover 255 may close the filter opening 216. A user may separate the filter cover 255, take out the filter 250, and then clean or replace the filter 250.

The blowing portion 200 may further include a channel guide 450 that is disposed in the blower housing 210 and guides the flow of air passing through the blowing fan 230. The channel guide 450 may have a pipe shape that extends to be curved and the blowing fan 230 may be disposed in the channel guide 450.

The channel guide 450 may be positioned over the filter 250 and may extend upward. Further, the upper end of the channel guide 450 may be connected to the discharge portion 400.

In detail, the channel guide 450 may include first curved portions 451a and 451b extending to be curved at a first side of an outer circumferential surface of the blowing fan 230, and second curved portions 455a and 455b extending to be curved at a second side of the outer circumferential surface of the blowing fan 230.

The first and second curved portions 451 and 455 each may include a portion tangentially extending with respect to the outer circumferential surface of the blowing fan 230 due to the shape of the blowing fan 230 that is a cross-flow fan. In detail, the first curved portion 451 may include a first part 451a for guiding air, which is circumferentially suctioned, at the first side of the outer circumferential surface of the blowing fan 230, and a second part 451b for guiding air that is circumferentially discharged.

The second curved portion 455 may include a first part 455a for guiding air, which is circumferentially suctioned, at the second side of the outer circumferential surface of the blowing fan 230, and a second part 455b for guiding air that is circumferentially discharged.

The first part 451a of the first curved portion and the first part 455a of the second curved portion may extend substantially in parallel, and the second part 451b of the first curved portion and the second part 455b of the second curved portion may extend substantially in parallel. Further, the first part 455a of the second curved portion 455 may perform a function that prevents air discharged from the blowing fan 230 from flowing back into the inlet of the blowing fan 230.

The discharge portion 400 may be provided at an outlet of the blowing fan 230. For example, the discharge portion 400 may be positioned over the blowing fan 230 and may configure the upper portion of the air cleaner 100.

In detail, the discharge portion 400 may include a discharge main body 410 having a discharge channel for the air that has passed through the blowing fan 230, and discharge vanes 420 provided to be able to open/close on the top of the discharge main body 410. For example, the discharge vanes 420 may be rotatably provided, and when the discharge vanes 420 are closed, the discharge vanes 420 may form a plane the same as the top surface of the desk D.

The discharge main body 410 may have a pipe shape and may protrude upward from the blower housing 210. That is, the upper end of the discharge main body 410 may be disposed higher than the upper end of the blower housing 210. For example, when the air cleaner 100 is installed on the top surface of the desk D, the upper end of the discharge main body 410 may form a plane substantially the same as the top surface of the desk D.

The discharge main body 410 may be configured to extend upward from the first and second curved portions. For example, the discharge main body 410 may be configured integrally with the channel guide 450.

The air cleaner 100 may further include a thermoelectric module 300 provided under the blowing portion 200. The thermoelectric module 300 is a component for generating cold air or hot air. Based on a polarity of the thermoelectric element 335 (see FIG. 5) of the thermoelectric module 300, the thermoelectric module may generate cold air and dissipate hot air, or generate hot air and dissipate cold air. That is, in the present disclosure, during cooling mode, the thermoelectric element may generate cold air from the top surface and dissipate hot air from the bottom surface. During the heating mode, the thermoelectric element may generate hot air from the top surface and dissipate cold air from the bottom surface. For purposes of the present disclosure, the operation where the thermoelectric element generates cold air from the top surface and dissipates hot air from the bottom surface (i.e., cooling mode) will be described hence forth. It should be noted that the structure of the air cleaner remains the same whether operating in the cooling mode or heating mode.

Because the thermoelectric module 300 is used, parts for operating a refrigeration cycle, for example, devices generating loud noise such as a compressor, are not provided in the air cleaner 100, so an effect of reducing noise while the air cleaner 100 is driven may be achieved.

The thermoelectric module 300 may be coupled to the bottom surface of the blowing portion 200 and may be disposed at the center portion of the blowing portion 200 in the left-right direction.

The thermoelectric module 300 may include a module body 310 having an air channel 311. For example, the module body 310 may have a substantially hexahedral shape.

A heat absorption heat sink 340 and a heat dissipation heat sink 320 may be disposed in the air channel 311 and the air channel 311 may be divided up and down by a module insulator 330. For example, the heat absorption heat sink 340 may be disposed over the heat dissipation heat sink 320. For the convenience of description, the heat absorption heat sink 340 may be referred to as a "first heat sink" and the heat dissipation heat sink 320 may be referred to as a "second heat sink".

A first suction hole 312 through which air is suctioned may be formed through one or both sides of the module body 310. For example, two first suction holes 312 may be formed through sides facing each other. Air suctioned through the first suction holes 312 may exchange heat while passing through the heat absorption heat sink 340 of the thermoelectric module 300.

A second suction hole 314 through which air is suctioned may be formed through one or both sides of the module body 310. For example, two second suction holes 314 may be formed through sides facing each other.

The sides of the module body 310 through which the second suction holes 314 are formed may be the same as the sides of the module body 310 through which the first suction holes 312 are formed. The second suction holes 314 may be formed under the first suction holes 312. Air suctioned through the second suction holes 314 may exchange heat while passing through the heat dissipation heat sink 320 of the thermoelectric module 300.

The thermoelectric module 300 may further include first heat absorption covers 371 coupled to the first suction holes 312 and second suction covers 375 coupled to the second suction holes 314.

The thermoelectric module 300 may include a thermoelectric element 335. The thermoelectric element 335 is an element that implements cooling and heating generation using Peltier effect.

A heat absorption portion of the thermoelectric element 335 may be disposed upward toward the heat absorption heat sink 340 and a heat dissipation portion of the thermoelectric element 335 may be disposed downward toward the heat dissipation heat sink 320. For example, the heat absorption portion of the thermoelectric element 335 may be formed on the top surface of the thermoelectric element 335 and the heat dissipation portion of the thermoelectric element 335 may be formed on the bottom surface of the thermoelectric element 335.

In detail, the heat dissipation heat sink 320 may be disposed at the lower portion in the module body 310 and may be in contact with the bottom surface of the thermoelectric element 335. The heat dissipation heat sink 320 may include a heat dissipation heat sink main body 321 having a substantially square or rectangular plate shape, and a first element coupling portion 322 that protrudes from the top surface of the heat dissipation heat sink main body 321 and to which the thermoelectric element 335 may be attached or fastened.

The heat dissipation heat sink 320 may include a heat dissipation fin 325 that is disposed under the heat sink main body 321 and exchanges heat with air suctioned through the second suction holes 314. The heat dissipation fin 325 may be a plurality of pieces and the plurality of heat dissipation fins 325 may be coupled to the bottom surface of the heat sink main body 321 and may extend downward.

The heat absorption heat sink 340 may be disposed at the upper portion in the module body 310 and may be in contact with the top surface of the thermoelectric element 335. The heat absorption heat sink 340 may include a heat absorption heat sink main body 341 having a substantially square or rectangular plate shape, and a second element coupling portion 342 that protrudes from the bottom surface of the heat absorption heat sink main body 341 and to which the thermoelectric element 335 may be attached or fastened.

The heat absorption heat sink 340 may include a heat absorption fin 345 that is disposed over the heat absorption heat sink main body 341 and exchanges heat with air suctioned through the first suction holes 312. The heat absorption fin 345 may be a plurality of pieces and the plurality of heat absorption fins 345 may be coupled to the top surface of the heat absorption heat sink main body 341 and may extend upward.

The thermoelectric module 300 may further include a module insulator 330 disposed between the heat absorption heat sink 340 and the heat dissipation heat sink 320. For example, the module insulator 230 may be disposed to surround the edge of the thermoelectric element 335.

An insulator opening 332 may be formed through the module insulator 330. The insulator opening 332 may be formed in a hole shape through the top and bottom surfaces of the module insulator 330.

The second element coupling portion 342 of the heat absorption heat sink 340 may be inserted into the insulator opening 332 in contact with the heat absorption portion of the thermoelectric element 335. The thermoelectric element 335 may be positioned in the insulator opening 335.

Further, the first element coupling portion 322 of the heat dissipation heat sink 320 may be inserted into the insulator opening 332 in contact with the heat dissipation portion of the thermoelectric element 335.

The air cleaner 100 may further include a heat dissipation fan 380 disposed under the thermoelectric module 300. The heat dissipation fan 380 may be an axial fan and the like. Further, a heat dissipation fan cover 385 may be provided under the heat dissipation fan 380.

When the heat dissipation fan 380 is driven, air may be suctioned into the module body 310 through the second suction holes 314, may exchange heat through the heat dissipation heat sink 320, and then may be discharged outside through the heat dissipation fan cover 385. The channel through which high-temperature air that has exchanged heat is discharged by operation of the heat dissipation fan 380 may be referred to as a "heat dissipation channel".

Meanwhile, when the blowing fan 230 is driven, air may be suctioned into the module body 310 through the first suction holes 312, may exchange heat through the heat absorption heat sink 340, and then may flow into the blowing portion 200. The channel through which low-temperature air that has exchanged heat is discharged by operation of the blowing fan 230 may be referred to as a "heat absorption channel".

The heat dissipation channel and the heat absorption channel are included in the air channel 311 in the module body 310, and the heat dissipation channel and the heat absorption channel may be separated by the module insulator 330.

The air cleaner 100 may further include a sensor 348 that senses the temperature of the heat absorption heat sink 340 and a controller 349. The sensor 348 may be installed on the surface of the heat absorption heat sink 340. For example, the sensor 348 may be installed on the surface of the second element coupling portion 342 or the heat absorption fin 345. Whether a condition for ending a defrosting mode is satisfied is determined on the basis of a value sensed by the sensor 348. For example, the sensor 348 may be a heat sensor and the like, and the controller 349 may be a microprocessor, an integrated circuit, an electrical circuit, and the like.

A blowing suction port 217 through which external air is suctioned may be formed through the bottom surface of the blower housing 210. The blowing suction port 217 may be formed at portions other than the module coupling portion 219 to which the thermoelectric module 300 is coupled, at the bottom surface of the blower housing 210.

In detail, the module coupling portion 219 to which the thermoelectric module 300 is coupled may formed at the bottom surface of the blower housing 210. The module coupling portion 219 may be formed substantially at the center portion of the bottom surface of the blower housing 210, and the thermoelectric module 300 may be coupled to the module coupling portion 219 and extends downward.

Further, the blowing suction port 217 may be formed at both sides of the blower housing 210 with the module coupling portion 219 at the center. Accordingly, the blowing suction ports 217 may be exposed to the outside without being closed by the thermoelectric module 300.

When the blowing fan 230 is driven, the air passing through the heat absorption heat sink 340 of the thermoelectric module 300 passes through the filter 250 through the module coupling portion 219 of the blower housing 210, and external air passes through the filter 250 through the blowing suction port 217. Further, the air and the external air that have passed through the filter 250 are mixed and may be discharged outside through the discharge portion 400.

Figure 8:
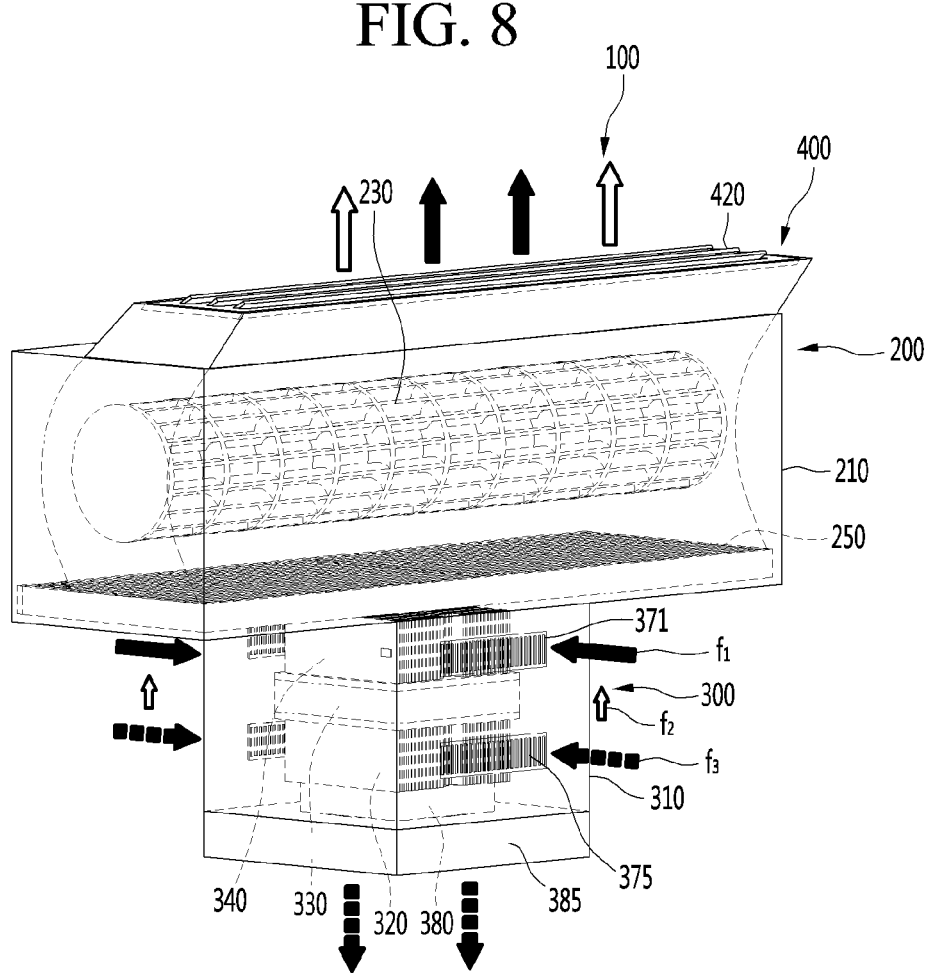
FIGS. 8 to 10 are views showing airflow at the air cleaner according to an embodiment of the present disclosure.
Figure 9:
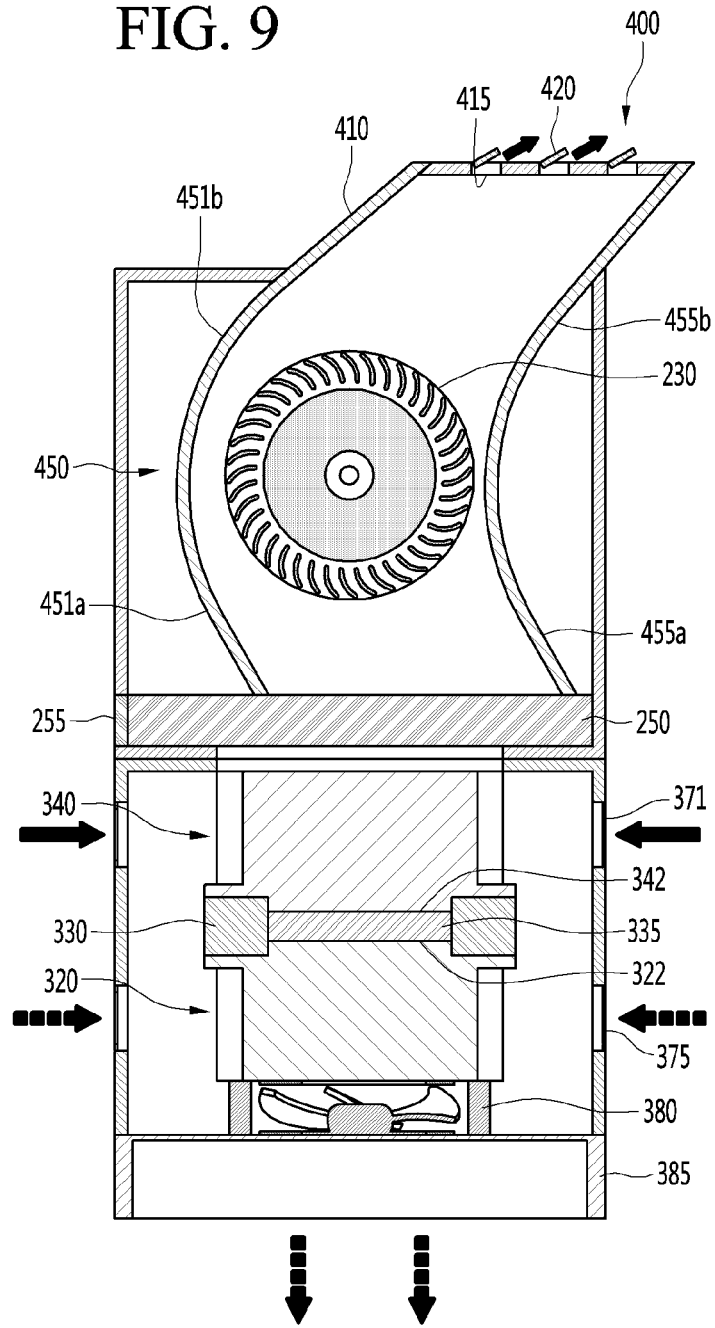
Figure 10:
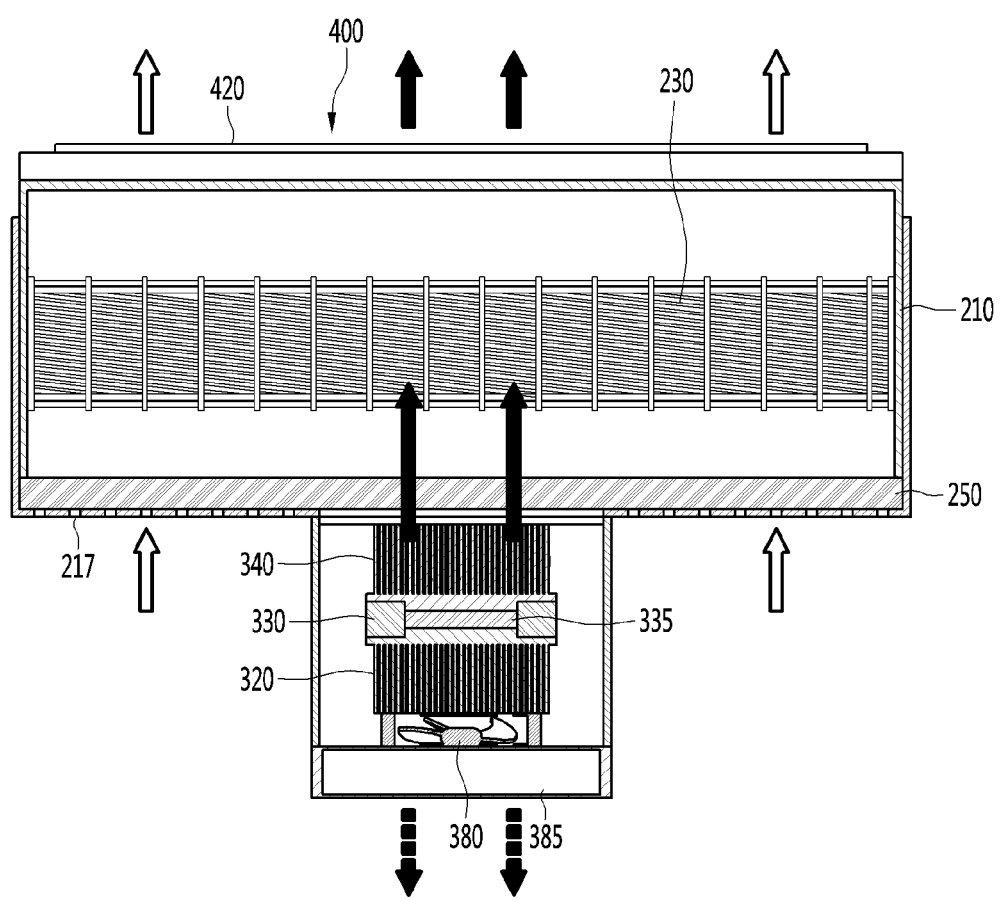

FIGS. 8 to 10 are views showing airflow at the air cleaner according to an embodiment of the present disclosure. The airflow at the air cleaner 100 is described with reference to FIGS. 8 to 10.

When the air cleaner 100 is turned on, the blowing fan 230 and the heat dissipation fan 380 may be driven. First, when the blowing fan 230 is driven, two different types of airflow may be generated.

In detail, as first airflow, external air may flow into the thermoelectric module 300 through the first suction cover 371 and passes through the heat absorption heat sink 340. In this process, the air is cooled and flows upward, thereby passing through the filter 250 (f1).

As second airflow, external air may flow into the blower housing 210 through the blowing suction port 217, and passes through the filter 250 (f2). The first and second airflow purified through the filter 250 may be mixed, passes through the blowing fan 230, and discharged outside through the discharge portion 400. That is, cooling flow f1 and air purification flow f2 may be both generated by one blowing fan 230.

On the other hand, when the heat dissipation fan 380 is driven, external air may flow into the thermoelectric module 300 through the second suction cover 375 and passes through the heat dissipation heat sink 320. In this process, the air is heated and flows downward, thereby passing through the heat dissipation fan 380. Further, the air may be discharged outside through the heat dissipation fan cover 385 (f3).

Figure 11:
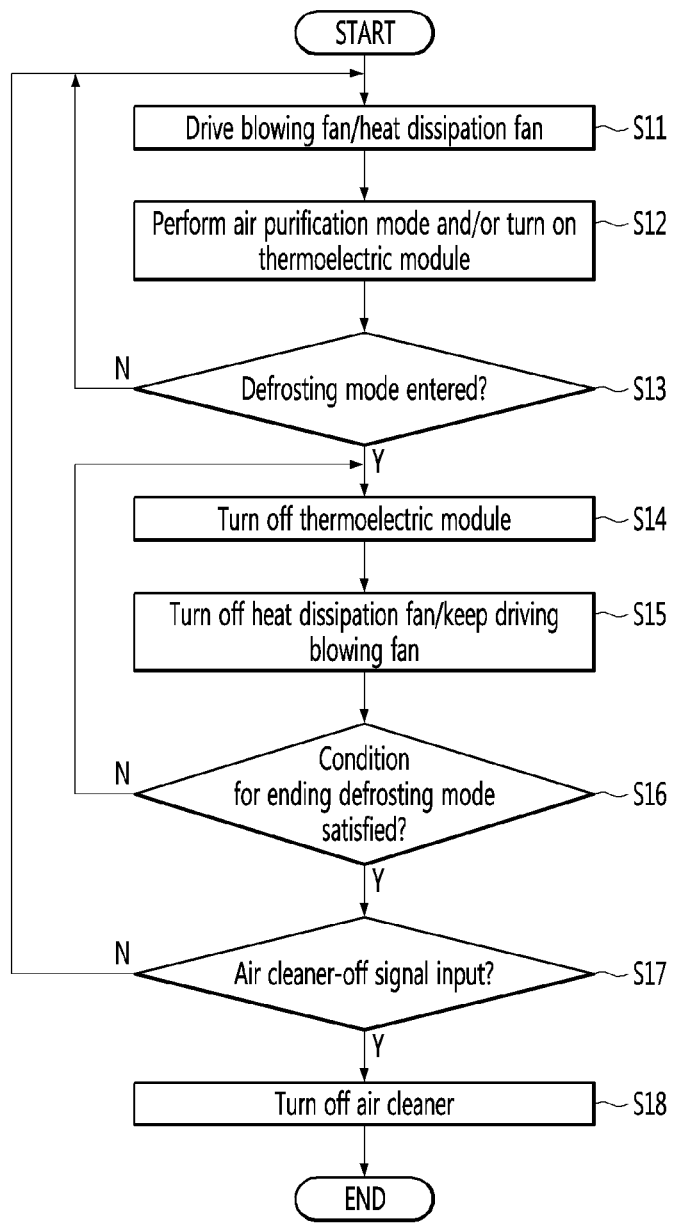
FIG. 11 is a flowchart showing a control method of the air cleaner according to an embodiment of the present disclosure.

FIG. 11 is a flowchart showing a control method of the air cleaner according to an embodiment of the present disclosure. For example, the controller 349 may perform the control method.

Referring to FIG. 11, when the air cleaner 100 according to an embodiment of the present disclosure is turned on, and the blowing fan 230 and the heat dissipation fan 380 may be driven, whereby the airflows f1, f2, f3 described with reference to FIGS. 8 to 10 are generated (S11). Further, power may be applied to the thermoelectric module 300, and cooling of air may be performed. Air purification (air purification mode) may be performed while the air passes through the filter 250 (S12).

As an optional step, whether an entry condition for performing a defrosting mode is satisfied is recognized. The entry condition may include whether a performing time of the air purification mode, that is, the accumulated operation time of the thermoelectric module 300 has reached a first set time (S13).

When the performing time of the air purification mode reaches the first set time, the defrosting mode is performed. In detail, the power of the thermoelectric module 300 may be turned off and the blowing ran 230 may keep operating. Further, the operation of the heat dissipation fan 380 may be stopped.

As the blowing fan 230 is driven, external air flows into the thermoelectric module 300 through the first suction cover 371, and in this process, external heat may transfer to the heat absorption heat sink 340. Accordingly, frost existing on the heat absorption heat sink 340 may be removed.

Further, as the operation of the heat dissipation fan 380 is stopped, heat is not dissipated to the external air from the heat dissipation heat sink 320, and heat may transfer from the heat dissipation heat sink 320 to the heat absorption heat sink 340 through the thermoelectric element 335 by conduction.

Since the heat dissipation heat sink 320 is disposed under the heat absorption heat sink 340, heat may easily transfer from the heat dissipation heat sink 320 to the heat absorption heat sink 340. By this action, frost existing on the heat absorption heat sink 340 may be removed (S14 and S15).

When the defrosting mode is performed, whether a condition for ending the defrosting mode is satisfied may be recognized. The condition for ending the defrosting mode may include whether temperature of the sensor 348 has been sensed over a set temperature.

As another example, the condition for ending the defrosting mode may include whether a second set time has passed after the defrosting mode is performed. For example, the second set time may be 3 minutes (S16).

When the condition for ending the defrosting mode is satisfied, the defrosting mode is ended. Further, when an off-signal of the air cleaner 100 is inputted, the power of the air cleaner 100 is turned off and the operation of the air cleaner is stopped. However, when the off-signal of the air cleaner 100 is not inputted, steps after S11 may be performed (S17 and S18).

Figure 12:
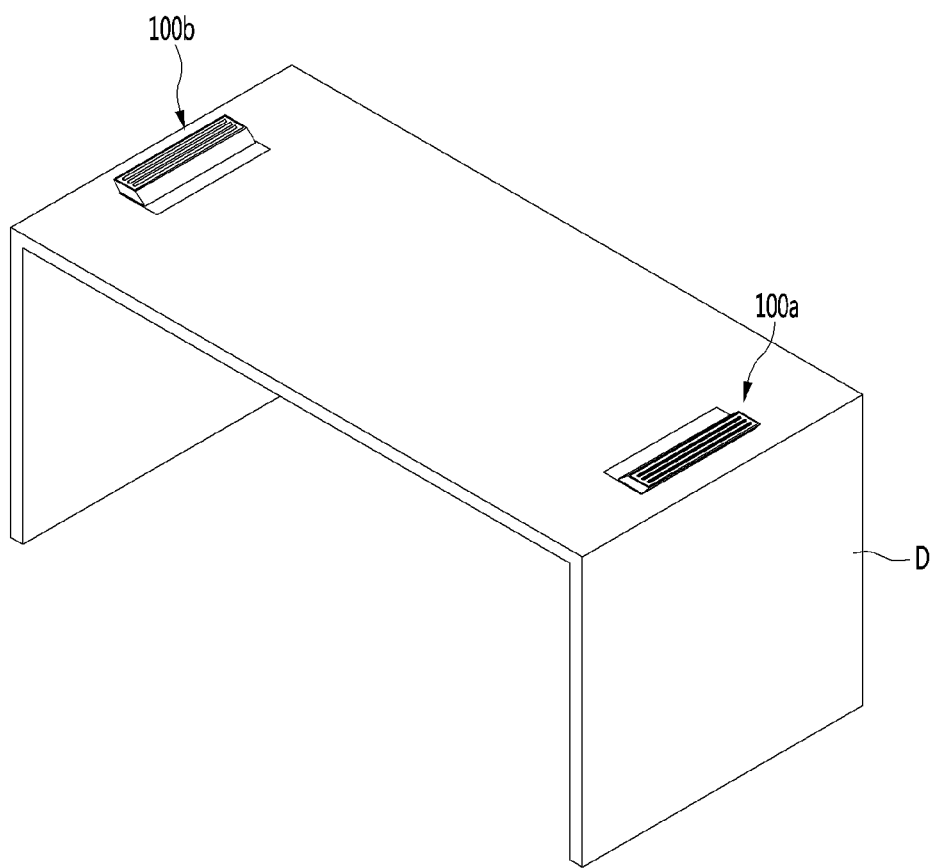
FIG. 12 is a view showing another example of installation of the air cleaner according to an embodiment of the present disclosure.

FIG. 12 is a view showing another example of installation of the air cleaner according to an embodiment of the present disclosure.

Referring to FIG. 12, an air cleaner according to an embodiment of the present disclosure, unlike that shown in FIG. 1, may be disposed at another position on the desk D. That is, a plurality of air cleaners may be installed on the desk D. In detail, the air cleaner may include a first air cleaner 100*a* and a second air cleaner 100*b*.

The first air cleaner 100*a* may be disposed at a left side on the desk D and air may be discharged toward the center portion of the desk D from the discharge portion of the first air cleaner 100*a*. The second air cleaner 100*b* may be disposed at a right side on the desk D and air may be discharged toward the center portion of the desk D from the discharge portion of the second air cleaner 100*b*.

Thus far, it was described in the above embodiment that the heat absorption heat sink 340 is disposed at the bottom surface portion of the blower housing 210 and the heat dissipation heat sink 320 is disposed under the heat absorption heat sink 340 to supply cold air to the user.

However, the heat dissipation heat sink may be disposed at the bottom surface portion of the blower housing 210 and the heat absorption heat sink may be disposed under the heat dissipation heat sink 320 to thereby supply hot air to the user. This configuration is achieved by making the function of the heat dissipation heat sink and the heat absorption heat sink described in the above embodiment to be switched when a countercurrent is applied to the thermoelectric module. When the countercurrent is applied to the thermoelectric module, the heat dissipation portion may be disposed upward and the heat absorption portion may be disposed downward. Thus, the first heat sink 340 above the thermoelectric element 335 may operate as the heat dissipation heat sink and the second heat sink 320 below the thermoelectric element 335 may operate as the heat absorption heat sink. The remaining components operate in the same manner as described in the above embodiment.

Hereafter, the configuration of the air cleaner according to another embodiment of the present disclosure is described. This embodiment may be different from the previous embodiment in some components, so the differences are mainly described, and the description and reference numerals of the previous embodiment may be referred to for the same or similar components.

Figure 13:
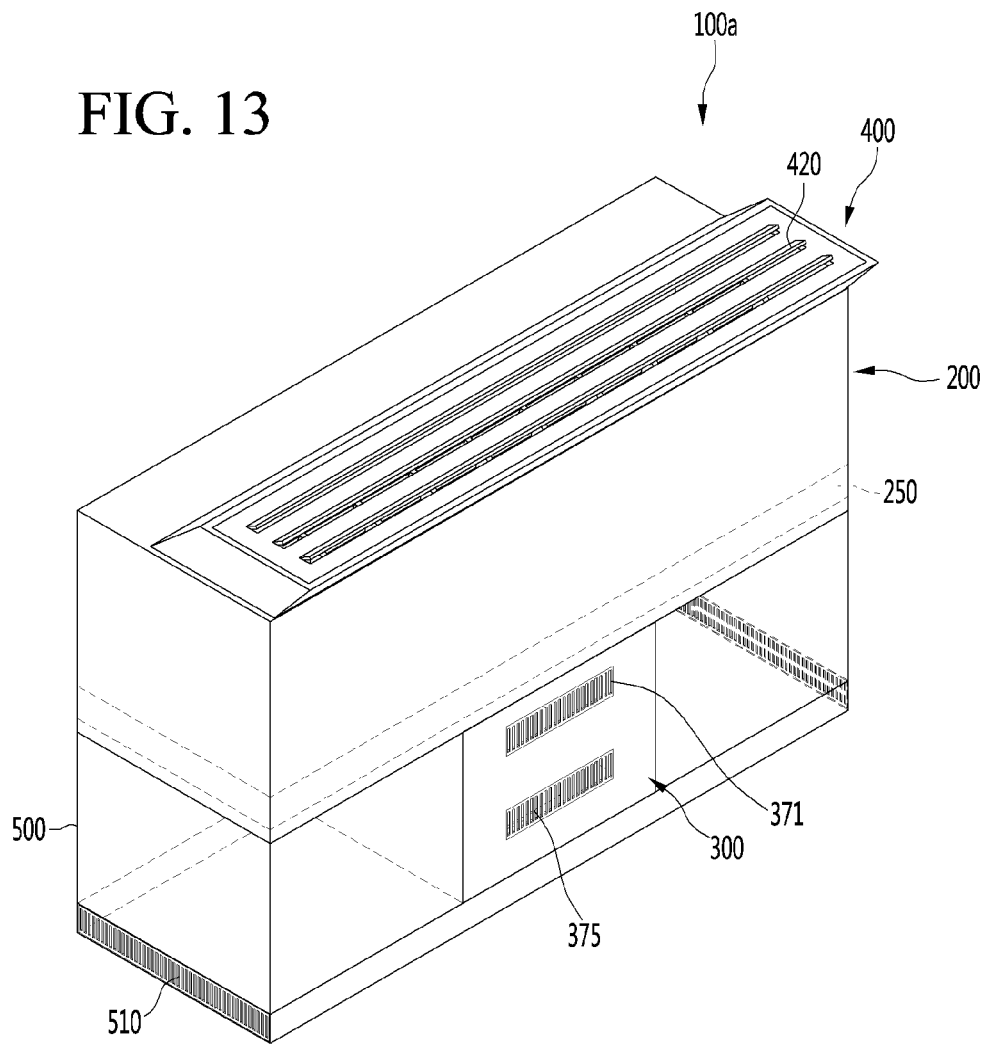
FIG. 13 is a perspective view showing the configuration of an air cleaner according to another embodiment of the present disclosure.

FIG. 13 is a perspective view showing the configuration of an air cleaner according to another embodiment of the present disclosure.

Referring to FIG. 13, an air cleaner 100*a* according to another embodiment of the present disclosure may be used as an independent product without being supported by furniture D. The air cleaner 100*a* is similar in configuration to the air cleaner 100 according to FIG. 1. In detail, the air cleaner 100*a* may include the components of the air cleaner 100 of FIG. 1, that is, the blowing portion 200, the thermoelectric module 300, and the discharge portion 400, among others.

The air cleaner 100*a* may further include a base 500 that may be placed on a floor or a predetermined surface. The base 500 may be disposed under the blowing portion 200 and the thermoelectric module 300 may be installed at the base 500.

The base 500 may include a base cover 510 through which air to be sent to the blowing portion 200 is suctioned. The base cover 510 may communicate with a blowing suction port (217, see FIG. 7) of the blowing portion 200. Accordingly, when the blowing fan 230 is driven, external air is suctioned into the air cleaner 100a through the base cover 510 and may be sent into the blowing portion 200 through the blowing suction port 217. The base cover 510 may be disposed on each of the left and right sides of the air cleaner 100a.

An opening through which air discharged from the heat dissipation fan cover 375 may be discharged may be formed at a portion corresponding to the lower portion of the thermoelectric module 300, at the bottom surface of the base 500. Further, the opening of the base 500 may be positioned higher than the portion, which is placed on the floor, etc., of the bottom surface of the base 500 so that air may be easily discharged out of the air cleaner 100a.

According to this configuration, the air cleaner 100a may function as a stand-alone air cleaner, so the user may simply put and use it at any place.

What is claimed is:

1. An air cleaner that is installable on a desk, the air cleaner comprising:
    a blower housing having a blowing fan installed therein;
    a filter provided at an inlet of the blowing fan, the filter provided inside the blower housing;
    a discharge portion provided at an outlet of the blowing fan; and
    a thermoelectric module provided under of the blower housing,
    wherein the thermoelectric module includes:
    a module body having first and second suction covers through which air is suctioned;
    a thermoelectric element having a heat absorption portion and heat dissipation portion;
    a first heat sink disposed to be in communication with a first side of the thermoelectric element and in which the air suctioned through the first suction cover passes;
    a second heat sink disposed to be in communication with a second side of the thermoelectric element and in which the_air suctioned through the second suction cover passes;
    a dissipation fan to generate airflow through the second suction cover,
    a module coupling portion to which the thermoelectric module is coupled is disposed at a bottom surface of the blower housing; and
    a blowing suction port to suction air is disposed at the bottom surface of the blower housing,
    wherein a plurality of airflows are generated based on operations of the blowing fan and the dissipation fan, the plurality of airflows including:
    a first airflow in which the air suctioned through the first suction cover passes through the first heat sink and the blowing fan when the blowing fan is driven;
    a second airflow in which the air suctioned through the blowing suction port passes through the filter when the blowing fan is driven; and
    a third airflow in which the air suctioned through the second suction cover passes through the second heat sink and the dissipation fan when the dissipation fan is driven.

2. The air cleaner of claim 1, wherein an air channel is formed in the module body, and
    the thermoelectric module further includes a module insulator disposed to divide the air channel and to separate the first and second heat sinks.

3. The air cleaner of claim 1, wherein the blowing suction port is disposed at both sides of the module coupling portion.

4. The air cleaner of claim 1, wherein the filter is disposed at a lower portion in the blower housing and covers the blowing suction port and an upper portion of the module coupling portion.

5. The air cleaner of claim 1, wherein the blowing fan includes a centrifugal fan.

6. The air cleaner of claim 5, further comprising a channel guide disposed in the blower housing to surround the blowing fan.

7. The air cleaner of claim 6, wherein the channel guide extends from a side of the filter and is connected to the discharge portion.

8. The air cleaner of claim 7, wherein the channel guide includes:
    a first curved portion extending to be curved at a first side of an outer circumferential surface of the blowing fan; and
    a second curved portion extending to be curved at a second side of the outer circumferential surface of the blowing fan.

9. The air cleaner of claim 1, wherein the discharge portion protrudes outside of the blower housing.

10. The air cleaner of claim 1, wherein the discharge portion includes discharge vanes that open and close.

11. The air cleaner of claim 1, wherein the first heat sink is a heat absorption heat sink and the second heat sink is a heat dissipation heat sink when the first side of the thermoelectric element is the heat absorption portion and the second side of the thermoelectric element is the heat dissipation portion.

12. The air cleaner of claim 1, wherein the first heat sink is a heat dissipation heat sink and the second heat sink is a heat absorption heat sink when the first side of the thermoelectric element is the heat dissipation portion and the second side of the thermoelectric element is the heat absorption portion.

13. An air cleaner that is installable on a furniture, the air cleaner comprising: a discharge portion disposed at a side of the furniture; a blowing fan to generate airflow toward the discharge portion; a blower housing accommodating the blowing fan and having a blowing suction port;
    a filter disposed at an inlet of the blowing fan to cover the blowing suction port; a heat absorption heat sink disposed at a suction side of the filter; a thermoelectric element having a heat absorption portion being in communication with the heat absorption heat sink;
    a heat dissipation heat sink being in communication with a heat dissipation portion of the thermoelectric element; a heat dissipation fan to generate airflow passing through the heat dissipation heat sink;
    a module coupling portion to which the thermoelectric element is coupled, the module coupling portion disposed at a bottom surface of the blower housing; and the blowing suction port disposed at both sides of the module coupling portion;
    wherein when the blowing fan is driven, air passes through the heat absorption heat sink and passes through the filter through the module coupling portion, and
    wherein when the blowing fan is driven, air that flows into the thermoelectric element through a first suction cover passes through the heat absorption heat sink and passes through the filter through the module coupling portion, and air that flows into the blower housing through the blowing suction port passes through the filter, and wherein the when the heat dissipation fan is driven, air flows into the thermoelectric module through a second suction cover and passes through the heat dissipation heat sink.

14. The air cleaner of claim 13, further comprising a module insulator to separate the heat absorption heat sink and the heat dissipation heat sink,
wherein the module insulator is provided to surround an edge of the thermoelectric element.

15. The air cleaner of claim 14, wherein an insulator opening is formed in the module insulator, and
the thermoelectric element is positioned in the insulator opening.

16. The air cleaner of claim 15, wherein the heat dissipation heat sink includes a first element coupling portion inserted into the insulator opening, the first element coupling portion being in communication with the heat dissipation portion of the thermoelectric element, and wherein the heat absorption heat sink includes a second element coupling portion inserted into the insulator opening, the second element coupling portion being in communication with the heat absorption portion of the thermoelectric element.

17. The air cleaner of claim 13, wherein a filter opening in which the filter is installed, is disposed at the blower housing, and
the filter is detachably mounted in the filter opening.

18. The air cleaner of claim 1, wherein the blowing suction port is disposed at both sides of the module coupling portion, wherein a direction of the second airflow is different from a direction of the third airflow.

19. The air cleaner of claim 1, wherein the first airflow is provided in an upper space of the desk and the second airflow is provided in a lower space of the desk, or wherein a direction of the first airflow comprises an airflow towards the upper space of the desk and a direction of the second airflow comprises an airflow towards the lower space of the desk.

* * * * *